(12) United States Patent　(10) Patent No.: US 7,934,770 B2
Toll　(45) Date of Patent: May 3, 2011

(54) BICYCLE SEAT

(75) Inventor: Steve Toll, Tampa, FL (US)

(73) Assignee: Tampa Bay Recreation, LLC, Lutz, FL (US)

( * ) Notice: Subject to any disclaimer, the term of this patent is extended or adjusted under 35 U.S.C. 154(b) by 0 days.

(21) Appl. No.: 12/685,311

(22) Filed: Jan. 11, 2010

(65) Prior Publication Data

US 2010/0109392 A1    May 6, 2010

Related U.S. Application Data

(63) Continuation of application No. 12/170,192, filed on Jul. 9, 2008, now abandoned, and a continuation of application No. 11/237,031, filed on Sep. 28, 2005, now abandoned.

(51) Int. Cl.
 *B62J 1/00* (2006.01)
(52) U.S. Cl. ......................................................... 297/202
(58) Field of Classification Search .................. 297/202, 297/201, 195.1
See application file for complete search history.

(56) References Cited

U.S. PATENT DOCUMENTS

| | | | |
|---|---|---|---|
| 464,653 A | 12/1891 | Latta | |
| 537,375 A | 4/1895 | Wright et al. | |
| 612,972 A | 10/1898 | Leech | |
| 1,858,477 A | 5/1932 | Blake | |
| 4,429,915 A | 2/1984 | Flager | |
| 4,999,068 A | 3/1991 | Chiarella | |
| 5,011,222 A | 4/1991 | Yates et al. | |
| 5,108,076 A | 4/1992 | Chiarella | |
| 5,676,420 A | 10/1997 | Kuipers et al. | |
| 5,765,912 A | 6/1998 | Bontrager | |
| 5,873,626 A | 2/1999 | Katz | |
| D409,009 S | 5/1999 | Toll | |
| D417,560 S | 12/1999 | Tollefson et al. | |
| 6,019,423 A | 2/2000 | Dodge et al. | |
| 6,193,309 B1 | 2/2001 | Gootter et al. | |
| D454,258 S | 3/2002 | Yates | |
| 6,422,647 B1 | 7/2002 | Turudich | |
| 6,783,176 B2 | 8/2004 | Ladson, III | |
| 7,077,469 B2 | 7/2006 | Farré | |
| D575,070 S | 8/2008 | Toll | |
| D604,056 S | 11/2009 | Toll | |
| D604,057 S | 11/2009 | Toll | |

OTHER PUBLICATIONS

Ulrich Schwarzer, Cycling and Penile Oxygen Pressure: the Type of Saddle Matters, European Urology 41 (2002) 139-143.
Karen N. Peart, Decreased Genital Sensation in Competitive Women Cyclists; J Sex Med, vol. 3 , 6 949-1101 (Nov. 2006).

(Continued)

*Primary Examiner* — David Dunn
*Assistant Examiner* — Tania Abraham
(74) *Attorney, Agent, or Firm* — Neifeld IP Law, PC (57) ABSTRACT

A bicycle seat is provided having a small front-end section formed by a bifurcated nose with a longitudinally extending gap therebetween, the bifurcated nose having elongated protrusions being substantially parallel to each other and having a substantially constant width and providing a substantially flat pubis bone support surface. The small front-end section can transition to a medial section having a top, a bottom, and sides and the medial section can transition to a rear-end section that is substantially flat. The seat can widen from the transition of the front-end section to the medial section as the seat extends to the rear-end section and the longitudinally extending gap can be approximately 30% to less than approximately 40% of a total length of the seat.

3 Claims, 5 Drawing Sheets

OTHER PUBLICATIONS

Ricardo Munarriz, Only the Nose Knows: Penile Hemodynamic Study of the Perineum—Saddle Interface in Men with Erectile Dysfunction Utilizing Bicycle Saddles and Seats with and without Nose Extensions; J Sex Med 2005;2:612-619, Boston, MA, USA; DOI: 10.1111/j.1743-6109.2005.00089.x, 2005.

Marsha K. Guess;Genital Sensation and Sexual Function in Women Bicyclists and Runners . . . ; J Sex Med 2006;3:1018-1027; Cincinnati, OH, USA;DOI: 10.1111/j.1743-6109.2006.00317.x.

Frank Sommer;Type of Saddle and Sitting Position Influence Penile Oxygen Pressure while Cycling; Klinik und Poliklinik für Urologie der Universität zu Köln Cologne, Mar. 2003.

Frank Sommer; Effects of bicycling on the male genital tract; Power Point Presentation Date unknown.

Side View of hip.pdf 60 degree position of saddle.pdf.

Front view of hip.pdf Top view of fully rotated hip in aero bars.pdf. Top view of pubis rami on saddle.pdf.

BICYCLE SEAT

CROSS-REFERENCE TO RELATED APPLICATIONS

This application is a continuation of U.S. patent application Ser. No. 12/170,192, filed Jul. 9, 2008, which claims the benefit of U.S. patent application Ser. No. 11/237,031, filed on Sep. 28, 2005, now abandoned, and the entirety of both which are herein incorporated by reference.

BACKGROUND

1. Technical Field

This invention relates to a bicycle seat. More particularly, the invention relates to a bicycle seat, which comfortably supports a bicycle rider.

2. Description of the Related Art

The basic design of a bicycle seat has not changed significantly over the years. The shape of modern bicycle seats has a generally horizontal profile with a narrow front-end section (the nose or horn) and a wider, flared tail section with a concave intermediate section for thigh clearance.

The seats include a pliable, semi-rigid molded plastic, or nylon shell, over which conforming padding material is placed, and finally a leather, plastic, or vinyl cover is fitted. The use of new materials in modern seats has resulted in a lighter, more durable and more appealing seat than those of even twenty years ago, but the seat contours remain substantially the same.

The seat of a bicycle is required to perform a number of functions for the rider. It must support the rider comfortably for rides of long duration, it must position the rider for maximum efficiency in pedaling the bicycle, and it must aid the rider in controlling and stabilizing the bicycle. Various seat configurations have been devised to attempt to meet these objectives simultaneously. Because a rider may assume different positions with respect to the pedals of the bicycle in order to achieve maximum power for different conditions, e.g., uphill versus level riding, it is desired that as the rider moves his body for optimal positioning, the seat should remain in contact with the rider to assure constant control.

Furthermore, it has being known to bicycle riders that the conventional bicycle seat can cause chafing, blistering, bruising, and possibly injury to the rider.

The design of the bicycle seat does not always provide a sufficient degree of comfort. The primary cause of discomfort is the pressure exerted on sensitive areas of the body (i.e. the sacral, coccal, ischial, and perineal/genital regions) when the weight of the rider rests on a traditional bicycle seat.

There have been various attempts in the prior art to design bicycle seats that provide greater comfort and hygienic safety.

In order to provide greater comfort to the rider, the prior art teaches pre-forming concave regions into the horizontal seat surface corresponding to the pelvic bone and perineum regions of the rider. The purpose is to reduce compression on the pudendal arteries and nerves while not interfering with movement of the rider's legs in the pedaling motion.

Another way to add conform to a bicycle seat is by adding a cushioning material to the seat surface. A cloth cover or like material is selectively stuffed with a flexible and resisting material to form soft cushion lobes in strategically placed ridges to support the pelvic bones of the rider. The recent trend in seat design is to find the right amount of padding necessary to provide adequate comfort to the rider, while still conforming to the seat shell. Too little padding conforms to the semi-anatomic shape of the seat nicely, but padding (especially foam) gives out at the point of most pressure and therefore bottoms out at the most painful areas directly beneath the pelvic bones. To address the point pressure problem inherent with foam-padded seats, manufacturers have introduced a viscoelastic polymer (VEP) padding to replace the foam padding on today's state of the art seats. These types of seats employ a gel like polymer to displace point loads under the ischial tuberosities. The gel like padding creates pressure displacement by immersing the buttocks area in a semi-liquid padding and spread out the point load pressure upon the ischial tuberosities. Because the gel like padding is a moveable fluid it still cannot firmly grip the pelvis; thus, undue movement of the pelvis occurs during a pedaling motion. This excessive movement or grinding of the pelvic areas can cause bruising, groin pain, numbness, urethritis, neuritis, seat sores, and chafing.

These problems are aggravated by the friction and pressure that is caused to be exerted on the blood vessels and nerves along the inner and underside of the rider's pelvic region. The front-end section (nose) of the seat fits directly against the pelvic structures. This results in occlusion of arteries and veins supplying blood flow to the penis, as well as, compression of local nerves as they are sandwiched between the nose of the bicycle seat and the bony structures of the anterior pelvis. The resultant outcome is a numbing effect or paresthesia, as reported by many cyclists that can result in sustained paresthesia of the groin and penis, delayed or immediate impotence, and perhaps even an elevated prostate specific antigen.

In addition, recent studies have linked perineal pressure caused by traditional bicycle seats to urinary tract and yeast infections. In female riders, the arch of the pubic symphysis is shallow. Sitting on traditional bicycle seats can compress tender genital tissues against the seat causing irritation to the genitals.

In male riders, the crotch area of the body contains nerves and pudendal arteries leading to the penis. These arteries carry blood flow that enables erection. Sitting on traditional bicycle seat can increase the pressure in the pudendal arteries causing a decrease in blood flow. This decrease in blood flow may cause numbness potentially leading to impotency in certain male bicycle riders.

Therefore, it is desirable to have a seat with a construction that is designed to eliminate these problems. In order to overcome these problems, the prior art provides the seat with a groove at the nose portion of the bicycle seat, which results in a right side nose portion separated by a gap from the left side nose portion. The opening reduces the downward pressure exerted on the genital area by the rider's weight.

U.S. Pat. No. 6,193,309 entitled "Bicycle Seat" to Gootter, et al." is an example of this approach. A disadvantage of this design is that in order to reduce the downward pressure exerted on the genital area, the Gootter reference forms a deep opening on the seat to receive the privates of the rider. However, such exaggerated deep opening become excruciatingly uncomfortable, especially during vigorous pedaling, since they require the rider to carefully align his or her privates with the deep opening. This becomes increasingly difficult when the rider must repetitively "get out of" the seat in order to stretch his or her legs or to move his position frequently to use different muscles to accommodate continuously changing terrain.

Accordingly, there is a need in the art for an improved bicycle seat that is specially contoured to fully support the coccyx, sacrum, and ischium bones, while providing a relieved area for the perineum/genital regions. This includes the support of the corresponding tissues and musculature surrounding these aforementioned pelvic areas.

In addition, there is also a need for a seat that would facilitate a bicycle rider's assuming several differing positions on the seat while avoiding the creation of undesirable pressure on the rider's perineum.

Furthermore, there is also a need for a seat that conformingly fits a rider's pelvis and buttocks by evenly distributing the point loads between the bony projections of the rider's pelvic region and the seat.

SUMMARY

It is an object of the present invention to provide a bicycle seat design that does not cause rider discomfort during or after extended periods of use.

It is another object of the present invention to provide a bicycle seat that is specially contoured to fully support the coccyx, sacrum, and ischium bones, while providing a relieved area for the perineum/genital regions.

It is another object of the present invention to provide a bicycle seat specially contoured to un-weight sensitive genital areas of both male and female riders.

It is another object of the present invention to provide a bicycle seat specially contoured to distribute the rider's weight evenly over a larger surface of the seat thereby eliminating point loads between the rider's pelvic bones and the hard contact area of the seat.

It is another object of the present invention to provide a bicycle seat that remains in contact with the rider in all positions to assure constant control of the bicycle.

The present invention relates to new and improved seats for bicycles, which is specially designed to conformingly support the sacral, coccyx, ischial and perineal/genital regions of the rider in order to improve rider comfort, and permit improvements in a rider's pedaling efficiency, and power output while remaining seated, and at the same time allows the rider to remain in contact with the seat in all positions to assure constant control of the bicycle.

The bicycle seat according to the present invention comprises:
 a small front-end section,
 a medial end section having a top, a bottom, a sides, and
 a rear end section.

The seat widens from the front-end section to the back-end section and defines a length L, a width W, and includes a central grove positioned in the longitudinal center of the seat. The central groove extends rearward to approximately 30-40% the length L of the seat to at least the medial section.

In addition, the front-end section is divided into two small noses separated by a cutout d. Furthermore, the sides of the medial section curve inward at the point where the two noses are divided.

The seat of the present invention comprises of combined features that provide full anatomical support and accommodation for areas of the pelvis (including the surrounding tissues and musculature) not heretofore supported by prior art seat designs.

In addition, the bicycle seat of the present invention is exceptionally comfortable to use even for very long periods of riding.

It is light in weight, small, attractive in appearance, and streamlined. The seat weight approximately 225 grams and its height is 45 mm.

The seat of this invention does not rely on the very flexible nature of today's padding materials to conform to the ischial areas of the pelvis. Instead, the seat of the present invention relays in a combination of features, such as extended nose, raised sides, cutout, and central groove, to provide greater and more even weight support to the rider. The elevation of the side of the medial section provides close anatomic support to unsupported rear sections of the pelvis so that a whole new dimension in load distribution is created. Thus, pressure upon the perineum/genital region is greatly diminished.

The foregoing has outlined rather broadly the more pertinent and important features of the present invention in order that the detailed description of the invention that follows may be better understood and so that the present contribution to the art can be more fully appreciated. Additional features of the invention will be described hereinafter, which form the subject of the claims of the invention. It should be appreciated by those skilled in the art that the concept and the specific embodiments disclosed may be readily utilized as a basis for modifying or designing other window facade for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

The description of the invention, together with the accompanying drawings, should not be construed as limiting the invention to the example shown and described, because those skilled in the art to which this appertains will be able to devise other forms thereof within the ambit of the appended claims.

DETAIL DESCRIPTION

The design of the bicycle seat according to the present invention provides various unique anatomic conforming features by fully supporting the sacrum, coccyx, and complete ischium of the rider.

To facilitate the understanding of the present invention, the invention will be explained by using as a sample the seat to a racing bike (first embodiment). A skilled artisan will understand that certain modifications are inherent in order to adapt the seat of the present invention to a touring or sport bicycle.

The seat 10 of the present invention includes:
a rigid shell/frame (not shown),
a cushioned area 12, and
an outerwear surface 14.

The frame is a one-piece frame preferably made of an injection molded polypropylene, polyurethane, polymer, ABS copolymer, nylon or other like material. The shell/frame includes an attachment device 20 for mounting the seat to the bicycle's frame 30.

The attachment device and the outerwear surface are all conventional and well known to those skilled in the art and will not be discussed in detail.

The seat 10 includes a very small front-end section (nose) 40, a medial end section 50, and a rear end section (tail) 60. The seat widens from the front-end section to the back-end section and defines a length L and a width W.

Please note that compare with the traditional bicycle seat, the seat of the present invention is of smaller length and width. After extensive research, the present inventor discovered that the preferably overall length of the seat should be 240 mm and the width 135 mm.

Front-End Section (Nose)

A feature of the present invention is the elimination of the elongated nose part of the traditional seat. The nose of the seat according to the present invention is very small compared with the nose of the traditional seats. The length of the nose is between 50-75 mm, preferably 65 mm.

The seat includes a central grove 90 positioned in the longitudinal center of the seat. This central groove 90 creates a narrow space where the rider's perineal/genital regions are positioned without experiencing any contact (e.g. pressure, pain) with the bicycle seat 10. The groove 90 is sized and contoured to provide pressure relief due to the contact of the private parts (perineum and/or genitalia, depending on forward or rearward riding position, respectively) of both male and female riders.

The central groove extends rearward to approximately 30-40% the length L of the seat to at least the medial section 50, and preferably to the point M where medial curves inward, which will be discussed below.

The maximum depth for the groove is between 90-100 mm. This feature of the present application is an important feature because the groove 90 does not need to be overly deep to provide adequate pressure relief as required by the seats of the prior art. This feature will overcome the disadvantages presented by the exaggerated deep front openings of the prior art that were previously discussed.

It is understood that the exact dimensions corresponding to the depth, width, and height of the groove 90 may vary within the scope of this invention, depending on the performance and comfort requirements of different riders and their bicycles. These dimensions can be varied to accommodate different sized pelvic structures and intended uses.

The front-end section 40 is divided into two small noses 70 that do not extend several inches farther forward than the front section as the traditional seat. Having a small nose eliminates the pressure on the perineum area produced by the traditional seats. Thus, the problems associated with numbness and decreased blood flows are eliminated.

Each of the noses 70 is strategically positioned and padded to provide support and cushioning for the rider's thighs. The noses provide support for the upper back portion of the rider's thighs, thereby reducing the amount left to be supported by the buttocks and groin area.

In addition to the narrow nose, the design of the present invention includes as a feature a cutout 100, which separates the right side nose 70 from the left side nose 70 at the front-end section 40 of the seat. This distance is indicated by reference character d, which is between 15-30 mm, preferably 25 mm.

The present invention contemplates having the central groove in the form of a different shape such as a rectangle, ellipse, pear, or hyperbola.

The central groove and the cutout cooperate with each other to define an open space for relieving pressure on the pudendal arteries of a seat occupant; thus, the seat provides increased comfort during extended periods of use, due to a redistribution of the rider's weight.

Medial Section

The medial section 50 includes an area 80 to support a rider's buttocks when the rider is in the performance position and the rider's tailbone is positioned over the medial section.

In the medial section 50 between the front end section 40 and the rear end section 60, the sides of the medial section 50 curves inward (elevates) at the point where the two noses 70 begin to form.

Furthermore, the seat is designed to begin the elevation at the exact point where the ischial tuberosities of the pelvis will be supported by the seat. This elevation in the sides closely follows the elevation of the rear right and left ischium of the pelvis. The unique design of the present invention provides pressure relief to the ischium in substantially all possible seated riding positions.

Figure 1:
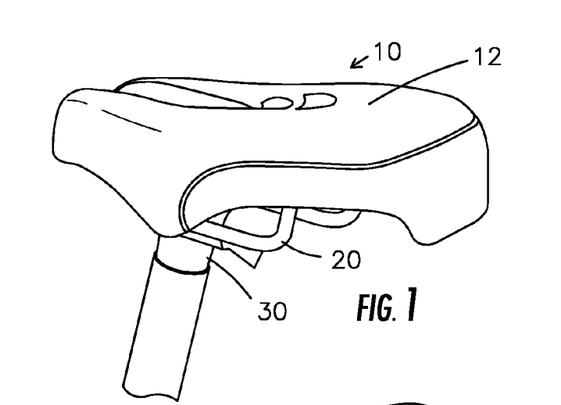
FIG. 1 is a perspective left side view of a seat for a racing bicycle constructed in accordance with the first embodiment of the present invention.
Figure 2:
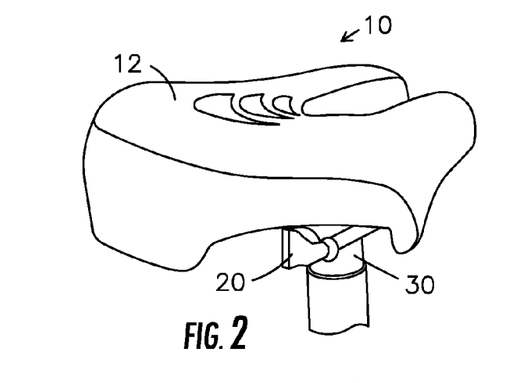
FIG. 2 is a perspective right side view of the seat for a racing bicycle constructed in accordance with the first embodiment of the present invention.
Figure 3:
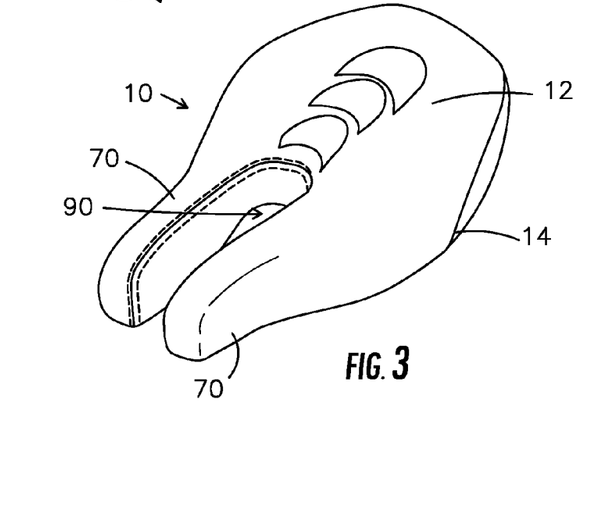
FIG. 3 is a perspective top view of the seat for a racing bicycle constructed in accordance with the first embodiment of the present invention.
Figure 4:
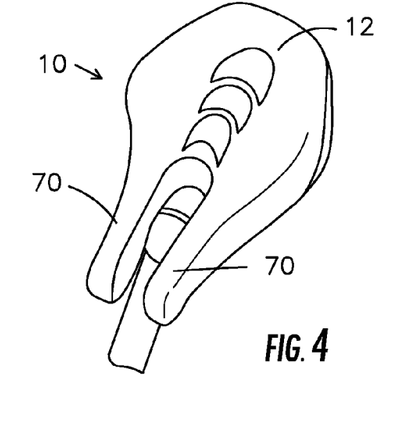
FIG. 4 is a top view of the seat for a racing bicycle constructed in accordance with the first embodiment of the present invention.
Figure 5:
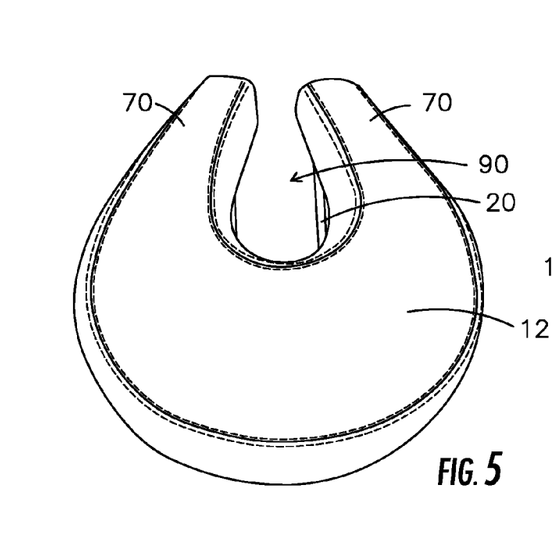
FIG. 5 is a perspective top view of the seat for a sport bicycle constructed in accordance with the second embodiment of the present invention.
Figure 6:
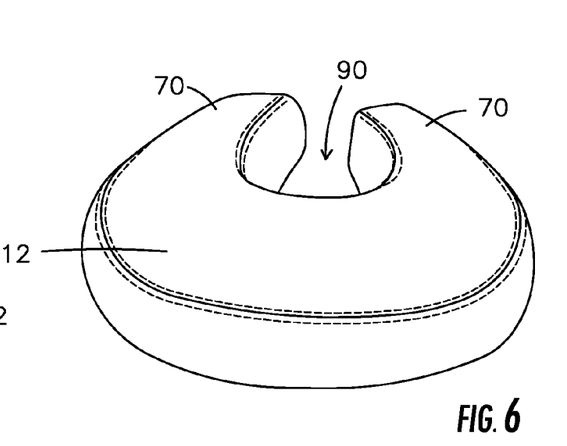
FIG. 6 is a perspective backside view of the seat for a sport bicycle constructed in accordance with the second embodiment of the present invention.
Figure 7:
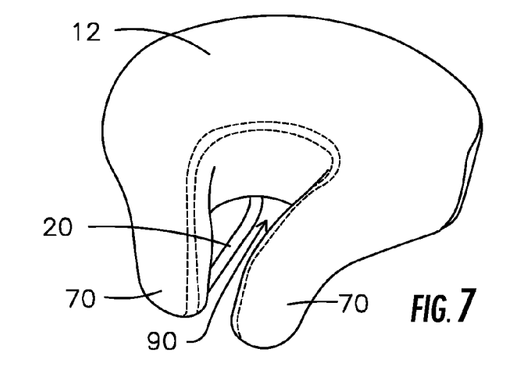
FIG. 7 is an enlarged perspective side view of the seat for a sport bicycle constructed in accordance with the second embodiment of the present invention.
Figure 8:
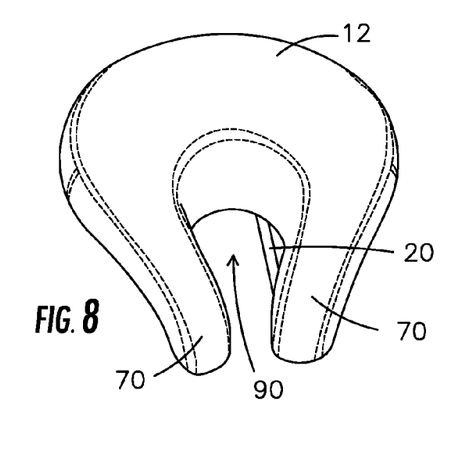
FIG. 8 is a perspective side view of the seat for a sport bicycle constructed in accordance with the second embodiment of the present invention.
Figure 9:
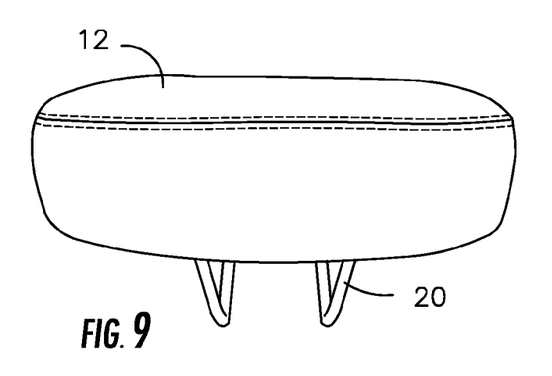
FIG. 9 is a backside view of the seat for a touring bicycle constructed in accordance with the third embodiment of the present invention.
Figure 10:
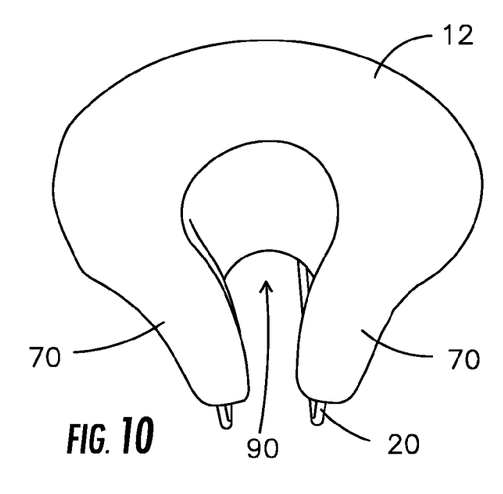
FIG. 10 is a perspective front view of the seat for a touring bicycle constructed in accordance with the third embodiment of the present invention.
Figure 11:
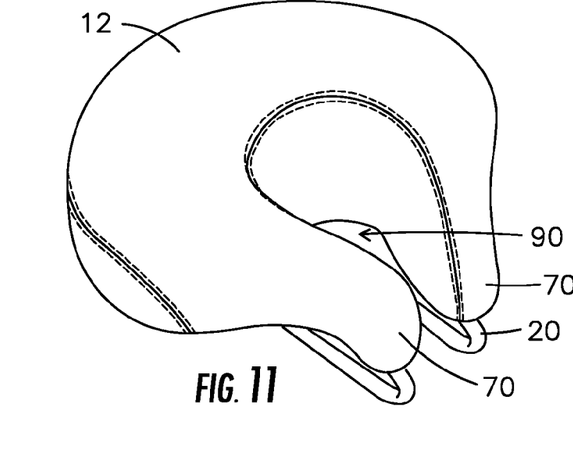
FIG. 11 is perspective side view of seat for a sport bicycle constructed in accordance with the third embodiment of the present invention.
Figure 12:
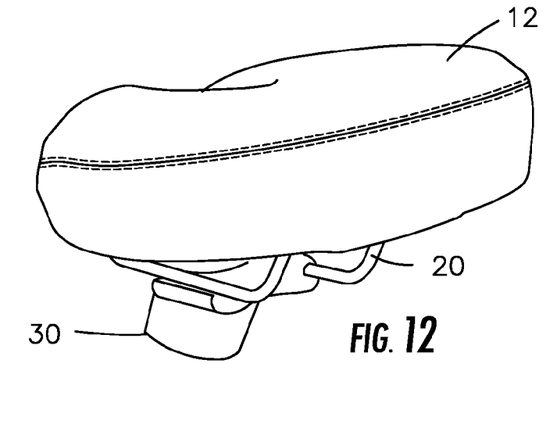
FIG. 12 is a backside view of a seat for a touring bicycle constructed in accordance with the second embodiment of the present invention.
Figure 13:
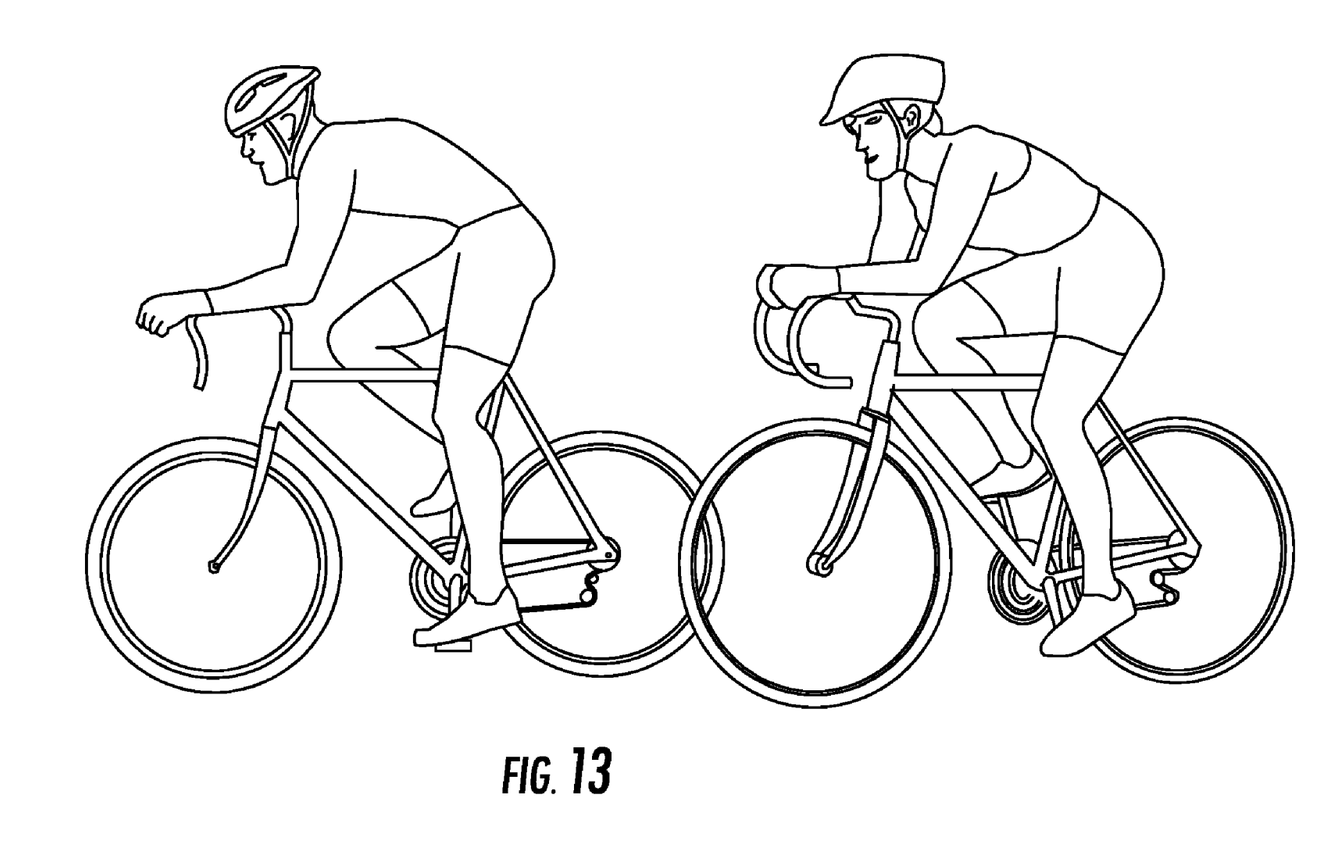
FIG. 13 is a side view illustrating the position of the rider on the seat of FIG. 1 while in racing position.
Figure 14:
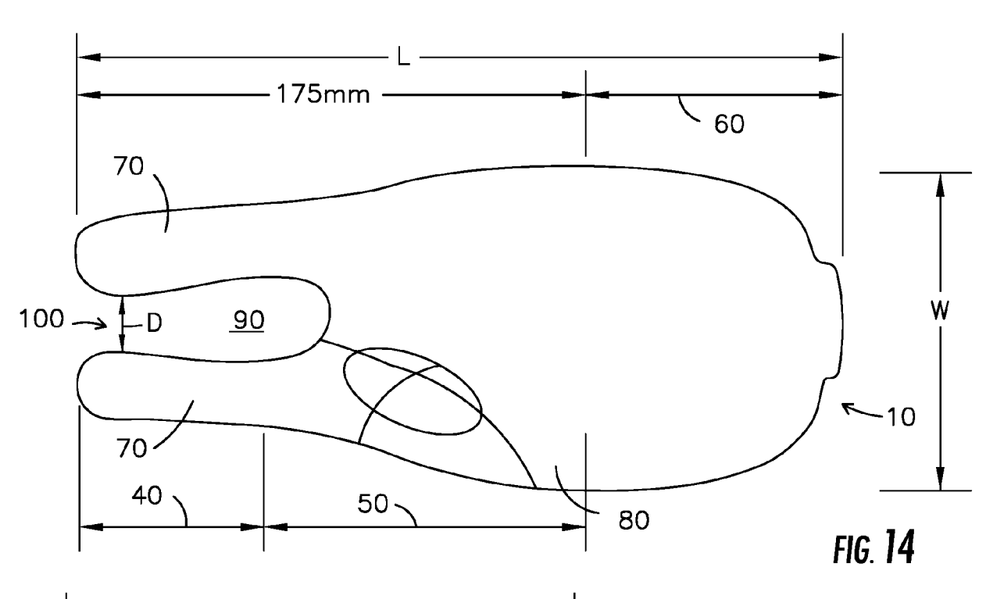
FIG. 14 is a top view of the seat for a racing bicycle of FIG. 1 illustrating the dimensions of seat.
Figure 15:
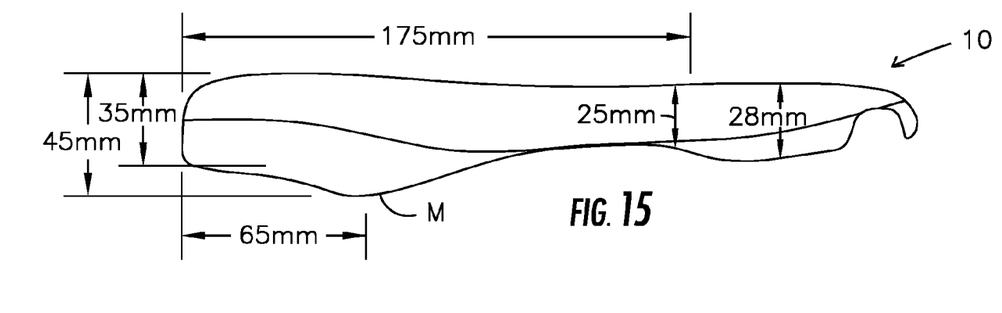
FIG. 15 is a side view of the seat for a racing bicycle of FIG. 1 illustrating the dimensions of seat.

The center of the seat begins to curve inward at approximately 65 mm from the tip of the nose to approximately 175 mm from the tip of the nose. The center curves inward to a vertical height of approximately 17 mm above point M (see FIG. 15).

In addition, the elevation of the medial section encourages proper lower back curvature (lumbar lordotic curvature) such that the rider assumes a more efficient posture. In addition, this feature avoids interferences with the hamstring muscle of the rider; thus, the rider can rotate his hips forward allowing him to obtain a more aerodynamic position.

Wind tunnel testing has proven that the above position puts the rider into a more aerodynamic position allowing the rider to save 15 to 20 seconds off of a 40K time trial.

The length of the medial section of the seat is between 90-130 mm, preferably 110 mm.

Rear End Section (Tail)

The rear portion supports the rider's buttocks when the rider is in the touring position and the rider's tailbone is positioned over the rear portion.

A feature of the present invention is that the top surface of seat 10 is approximately flat. The surface of the traditional seats includes an inclination towards the nose of the seat.

The tail section 60 is well-padded and relatively skinny (as compared with bicycle seats of the traditional configuration). The widest point is approximately 135 mm Furthermore, the present invention considers placing a gel layer against any appreciable lateral movement relative to the shell and be of a thickness and in a location, which permits only limited up and down deflection. It has been found that the thin gel layer should be located below the rider's ischial pelvic or sitting bones and genital areas, and if the gel layer extends downwardly onto the sloping side portions of the seat, it will undesirably cause excessive movement for the rider along with rubbing and chafing of the skin.

The gel layer should have sufficient thickness to provide adequate deformation to relieve excessive pressure on the pelvic bones so as to provide a comfortable ride.

A layer of relatively firm plastic foam is advantageously and preferably provided between the seat lower shell and the flexible cover to provide additional resilient support for the rider and for constraining the gel layer.

The present embodiments of this invention are, thus, to be considered in all respects as illustrative and not restrictive; the scope of the invention being indicated by the appended claims rather than by the foregoing description. All changes which come within the meaning and range of equivalency of the claims are intended to be embraced therein.

The seat of the present invention comprises of combined features that provide full anatomical support and accommodation for areas of the pelvis (including the surrounding tissues and musculature) not heretofore supported by prior art seat designs.

In addition, the bicycle seat of the present invention is exceptionally comfortable to use even for very long periods of riding.

It is light in weight, small, attractive in appearance, and streamlined. The seat weight approximately 225 grams and its height is 45 mm.

The seat of this invention does not rely on the very flexible nature of today's padding materials to conform to the ischial areas of the pelvis. Instead, the seat of the present invention relays in a combination of features, such as extended nose, raised sides, cutout, and central groove, to provide greater and more even weight support to the rider. The elevation of the side of the medial section provides close anatomic support to unsupported rear sections of the pelvis, so that a whole new dimension in load distribution is created. Thus, pressure upon the perineum/genital region is greatly diminished.

Seat for a Touring Bicycle

The seat for a touring bicycle is design for maximum comfort. The present invention contemplates adding high-density foam padding to the basic design, widening the seat base and adding a leather covering.

Seat for a Sport Bicycle

The seat for a touring bicycle is designed for maximum comfort. The present invention contemplates adding gel padding to the basic design, smaller seat than the seat for the touring bicycle and adding a leather covering.

The invention claimed is:

1. A bicycle seat for a bicycle, said bicycle seat designed to be mounted to a bicycle frame of said bicycle, said bicycle seat comprising:
    a rigid frame;
    a cushioned area; and
    an outer wear surface;
    wherein said frame is a one-piece frame that includes an attachment device for mounting the seat to the bicycle's frame;
    wherein said outer wear surface of said bicycle seat defines surfaces of a small front-end section, a medial section, and a rear-end section,
    wherein a distance along a longitudinal direction from front to back of said bicycle seat, along a longest extension of said bicycle seat in said longitudinal direction, is 240 mm;
    wherein a width of said bicycle seat along a latitudinal direction that is perpendicular to said longitudinal direction, at a widest point of said bicycle seat, is approximately 135 mm;
    said small front-end section defining a bifurcated nose defining two elongated protrusions that are substantially parallel to one another, and defining a longitudinally extending gap there between;
    wherein each one of said elongated protrusions has an inner side surface such that inner side surfaces of the two elongated protrusions oppose one another, and a distance between said inner side surfaces, at a point at which said inner side surfaces are closest to one another, is between 15 and 30 mm;
    wherein each elongated protrusion terminates at a distal tip;
    said small front-end section transitioning to said medial section having a top, a bottom, and sides;
    the medial section transitioning to said rear-end section that is substantially flat;
    wherein said bicycle seat widens from the transition of the front-end section to the medial section; and
    wherein the longitudinally extending gap is approximately 30% to 40% of said longest extension of said bicycle seat; and
    wherein each one of said two elongated protrusions has a distal protrusion section having a distal protrusion section upper surface, wherein each distal protrusion section defines a distal protrusion section outer side surface on the outer side of the corresponding distal protrusion section, such that a distal protrusion section inner side surface, the distal protrusion section upper surface, and distal protrusion outer side surface of each one of said distal protrusion sections forms the entire inner, top, and side surfaces thereof, and
    wherein said entire distal protrusion section outer side surface is substantially vertical such that pressure on the pudendal artery is avoided.

2. The bicycle seat of claim 1, wherein the rear-end section is raised in comparison to the front-end section.

3. The bicycle seat of claim 1, wherein a width of said longitudinally extending gap along a substantial region of said distal protrusion sections is substantially constant.

* * * * *